(12) United States Patent
Hedley

(10) Patent No.: US 10,789,472 B1
(45) Date of Patent: Sep. 29, 2020

(54) MULTIPLE IMAGE PROCESSING AND SENSOR TARGETING FOR OBJECT DETECTION

(71) Applicant: Amazon Technologies, Inc., Seattle, WA (US)

(72) Inventor: Jonathan Andrew Hedley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 15/623,073

(22) Filed: Jun. 14, 2017

(51) Int. Cl.
*G06K 9/00* (2006.01)
*G06T 7/11* (2017.01)
*G06T 7/174* (2017.01)

(52) U.S. Cl.
CPC ......... *G06K 9/00671* (2013.01); *G06T 7/11* (2017.01); *G06T 7/174* (2017.01); *G06T 2207/10148* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 6,215,519 B1* | 4/2001 | Nayar | ............... | G08B 13/19608 348/148 |
| 8,860,780 B1* | 10/2014 | Davey | ............... | H04N 7/18 348/39 |
| 9,275,308 B2* | 3/2016 | Szegedy | ............... | G06K 9/4628 |
| 9,524,418 B2* | 12/2016 | Velozo | ............... | G06K 9/00228 |
| 2004/0257677 A1* | 12/2004 | Matsusaka | ............... | G02B 9/58 359/783 |
| 2005/0053274 A1* | 3/2005 | Mayer | ............... | G03B 21/18 382/154 |
| 2016/0261906 A1* | 9/2016 | Jang | ............... | H04N 21/437 |
| 2018/0283969 A1* | 10/2018 | Wang | ............... | G01L 11/02 |

FOREIGN PATENT DOCUMENTS

WO     WO-9959116 A1 * 11/1999 ......... G06K 9/00778

OTHER PUBLICATIONS

X. Chen, J. Hwang, et al. "A Quality-of-Content-Based Joint Source and Channel Coding for Human Detections in a Mobile Surveillance Cloud," in IEEE Transactions on Circuits and Systems for Video Technology, vol. 27, No. 1, pp. 19-31, Jan. 2017, doi: 10.1109/TCSVT.2016.2539758. (Year: 2017).*

Pengfei Li,Limin Dong b, Huachao Xiao c, Mingliang Xu da, "A cloud image detection method based on SVM vector machine" Neurocomputing, vol. 169, Dec. 2, 2015, pp. 34-42, Available online Jun. 11, 2015, https://doi.org/10.1016/j.neucom.2014.09.102 (Year: 2015).*

* cited by examiner

*Primary Examiner* — Tahmina N Ansari

(74) *Attorney, Agent, or Firm* — Lowesnstein Sandler LLP

(57) ABSTRACT

A method and system for capturing an image of a portion of an environment including an object of interest and uploading of the image to a service for further image analysis. The system captures a first image of an environment or scene using a first sensor of an image capture device. A region of interest is detected within the first image using an object detection model. A set of coordinates corresponding to the portion of the first image is identified and used to position a second sensor. The second sensor captures a second image including the targeted region of interest, wherein the second image has a higher resolution than the first image. The second image is uploaded to an object detection service for the further image analysis.

20 Claims, 6 Drawing Sheets

MULTIPLE IMAGE PROCESSING AND SENSOR TARGETING FOR OBJECT DETECTION

BACKGROUND

Various image capture scenarios use cloud-based image analysis for detection of objects in captured images. For example, a bodycam, dashcam, surveillance camera, or other public safety or consumer operated monitoring equipment may be employed to capture images of an environment and transmit those images to a cloud-based recognition service for further processing.

To this end, conventional systems and methods involve the uploading of a continuous stream of high resolution data to the cloud-based recognition service, resulting in a significant bandwidth, cost and power consumption burden. Additionally, the sensing equipment may be configured to capture a wide field of view, but may be unable to capture images with a high enough resolution for subsequent recognition of specific objects, such as a person's face.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

Figure 1:
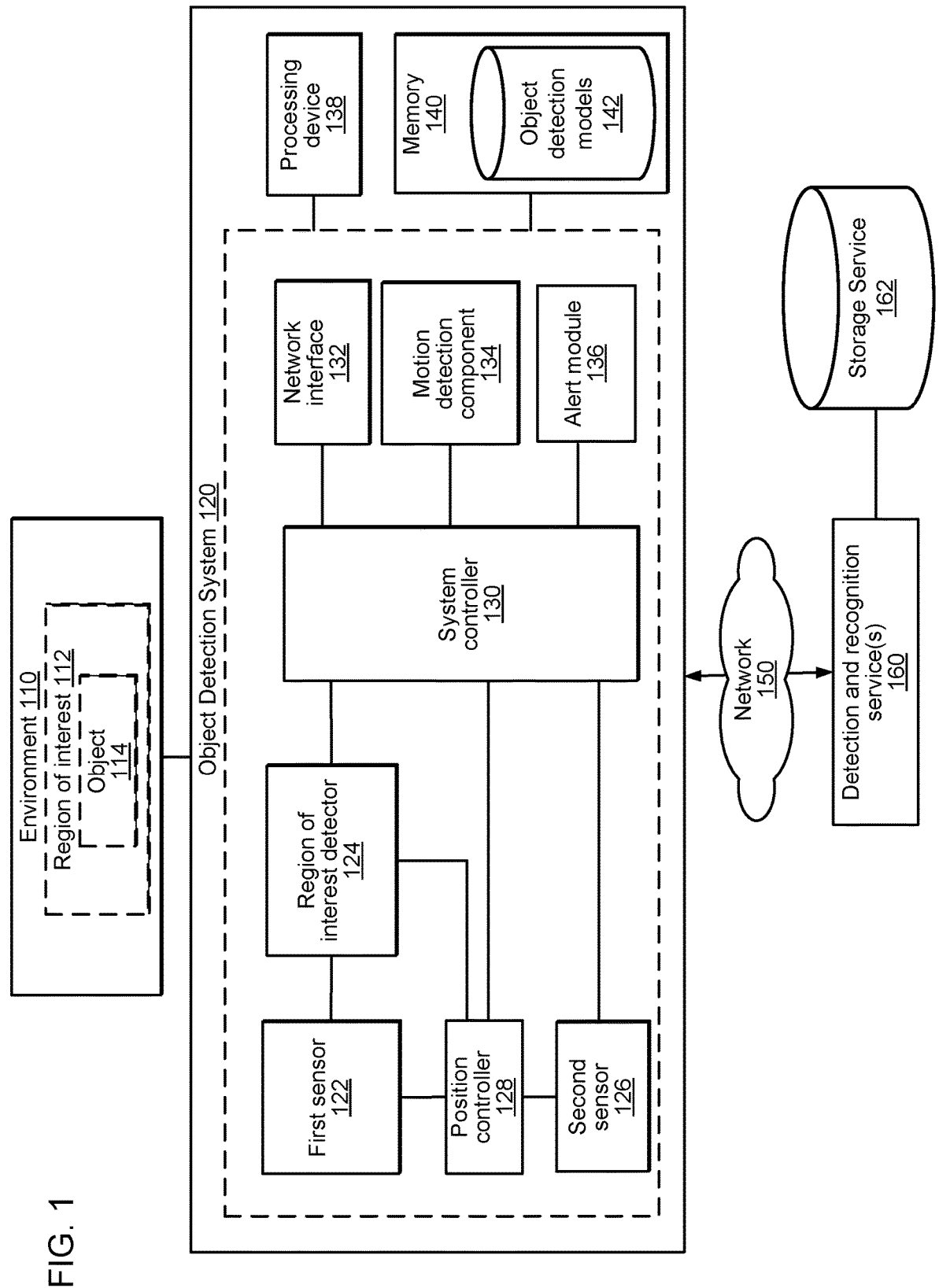
FIG. 1 illustrates an example object detection system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to capturing a first image of an environment or scene using a first sensor of an image capture device. In one embodiment, the first image is analyzed using object detection modeling to identify a region of interest in the first image. In one embodiment, the region of interest is a portion of the first image that may include a detected object (e.g., a person's face, a license plate, a weapon, etc.) as determined during the object detection modeling. In one embodiment, information about the region of interest (e.g., bounding box coordinates) is used to control or position a second sensor to capture a second image targeting the region of interest. In one embodiment, the second image represents a higher resolution than the first image, and is transmitted (e.g., uploaded) to an object detection service for further processing.

In one embodiment, the image capture device may include a wide-angle sensor configured to capture the first image. In one embodiment, the first image is analyzed by a region of interest detector to identify a region of interest or first portion of the first image. In one embodiment, the first portion of the first image includes an object identified by the region of interest detector applying one or more object detection models. In one embodiment, the one or more object detection models may be stored locally on the image capture device or stored remotely by another system communicatively connected to the image capture device. In one embodiment, a collection of object detection models may be stored on the image capture device and employed to identify a first portion or region of interest in a first image potentially including an object of interest. In one embodiment, the collection of object detection models is scalable in the image capture device. Additionally, the image capture device may receive additional object detection models from another system (e.g., a service) for storage on the image capture device.

In one embodiment, the image capture device may include a second sensor controlled by a position controller. In one embodiment, the position controller may use targeting parameters identified based on the set of coordinates corresponding to the first portion of the first image. For example, application of one or more object detection models to the first image may result in the identification of coordinates (e.g., bounding box coordinates) corresponding to the position or location of the region of interest in the environment. The position controller employs the set of coordinates to position or target the second sensor to capture an image of the region of interest.

In one embodiment, the second sensor is configured to capture a high resolution image of the portion or region of interest (e.g., an image having a resolution of 1920×1200 pixels, 3840×2160 pixels, etc.). In one embodiment, the image captured by the second sensor (i.e., the second image) has a higher resolution than the image captured by the first sensor (i.e., the first image). Accordingly, the second image is a high resolution image corresponding to the region of interest including the object detected during processing of the first image.

In one embodiment, multiple portions or regions of interest of the first image are identified, and coordinates (e.g., two-dimensional x-y coordinates) are determined for each portion of the first image. The position controller may position the second sensor for generation of the second image based on a first set of coordinates associated with the first portion of the first image, and may then position the second sensor for generation of a third image based on a second set of coordinates associated with the second portion of the first image.

In one embodiment, a digital representation of the second image is received and processed by the image capture device. For example, the digital representation of the second image may include digitized information about the image including the image properties or other metadata associated with the image. In one embodiment, the digital representation of the second image may be uploaded by the image capture device to a service for further processing. For example, the service may be a cloud-based image analysis service configured to perform object detection. In one embodiment, the service may further generate alerts relating to the object detection analysis performed on the information corresponding to the image received from the image capture device. In one embodiment, the service may transmit alert information to be processed by an alert interface of the image capture device.

FIG. 1 is a block diagram illustrating various components of an object detection system 120, according to one embodiment. In one embodiment, the object detection system 120 may be an image capture device configured to capture and process images corresponding to an environment 110 including one or more regions of interest 112 having one or more objects of interest 114. In one embodiment, the object detection system 120 may include a system controller 130 operatively coupled to a first sensor 122, a region of interest detector 124, a second sensor 126, a position controller 128, and a network interface 132. In one embodiment, the object detection system 120 may further include a motion detection component and an alert module 132 operatively coupled to the system controller 130. In one embodiment, the object detection system 120 may further include a processing device 138 and a memory 136 configured to execute and store instructions associated with the functionality of the various components, services, and modules of the object detection system 120, as described in greater detail below in connection with FIGS. 2-7.

In one embodiment, the object detection system 120 may communicate with one or more services 160 (e.g., one or more devices hosting the one or more services 160) via a network 150. In one embodiment, the one or more services 160 may include an object detection and recognition system (e.g., the Amazon® Rekognition® system). In one embodiment, each service 160 may be associated with a storage service 162 configured to store object detection models, images, digital representations of images, mappings between detected objects and corresponding alert information, etc. In one embodiment, the objection detection system 120 communicates with the one or more services via the network interface 132. For example, the network interface 132 may be any suitable communication interface such as an onboard cell modem, a WiFi antenna, a Bluetooth communication device, or other internet access device. In one embodiment, the network 150 may be any suitable network, including, for example, the Internet, intranets, extranets, wide area networks (WANs), local area networks (LANs), wired networks, wireless networks, or other suitable networks, etc., or any combination of two or more such networks.

In one embodiment, the first sensor 122 of the object detection system 120 captures a digital representation of a first image of at least a portion of the environment 110. In one embodiment, the first sensor may be an image capturing component configured to allow a greater depth of field. For example, the first sensor may have a relatively small focal length to emphasize differences in size or distance between objects in a foreground and a background of the environment 110. For example, the first sensor may be a wide-angle sensor configured to capture a large field of view at a low resolution (e.g., 320×240 pixels). In one embodiment, the first image may be optically stabilized to minimize motion blur.

In one embodiment, the region of interest detector 124 receives a digital representation of the first image and performs an object detection analysis using one or more object detection models 142. In one embodiment, the one or more object detection models 142 may be stored in the memory 140 of the object detection system 120. In one embodiment, the object detection models may be a set of instructions configured to analyze data corresponding to an image and determine if an object (e.g., a person, a weapon, a license plate, etc.) is identified. For example, the object detection system may include an image capturing device (e.g., a camera) including a memory storing one or more object detection models for application to the digital representation of the first image. In one embodiment, the collection of object detection models 142 is scalable and pluggable via connections to one or more systems configured to provide additional object detection models and detection capabilities. For example, the object detection models 142 may be updated, enhanced, scaled, and plugged into the objection detection system 120 by way of communications with one or more other systems via the network interface 132.

In one embodiment, the region of interest detector 124 may be implemented using a central processing unit (CPU) or a graphic processing unit (GPU) configured to detect the region of interest algorithmically or with one or more neural net models. In one embodiment, the CPU and/or GPU corresponds to processing device 128. For example, the region of interest detector 124 may employ a compressed neural net trained to generate region of interest proposals, which are evaluated against object-specific compressed neural nets to identify objects such as faces, bodies, license plates, weapons, etc. In one embodiment, the region of interest detector 124 may include a deep learning neural network. For example, the region of interest detector 124 may include a lightweight neural network, a convolutional neural network (CNN), a region-based convolutional neural network (R-CNN), or other neural network configured to detect objects and regions of interest.

In one embodiment, the region of interest detector 124 identifies one or more portions or regions of interest 112 within the first image based on the image analysis described above. For example, the identified portion of the first image or region of interest includes an object detected by application of the one or more object detection models 142. In one embodiment, upon detection of a region of interest, the region of interest detector 124 identifies a set of coordinates corresponding to a position or location of the identified portion within the first image. For example, the set of coordinates may include region or bounding box coordinates. In one embodiment, the bounding box coordinates are x and y coordinates. In one embodiment, the bounding box coordinates are expressed in terms of pixel locations in the first image. In one embodiment, the set of coordinates corresponding to the identified portion of the first image is received by the system controller 130.

In one embodiment, the system controller 130 provides the set of coordinates to the position controller 128. In one embodiment, the region of interest controller 124 may provide the set of coordinates to the position controller 128. In one embodiment, the position controller 128 uses the set of coordinates to control position parameters associated with the second sensor 126. For example, the position parameters may include a pitch parameter of the second sensor 126, a yaw parameter of the second sensor 126, a zoom parameter of the second sensor 126, or a combination thereof. In one embodiment, using the set of coordinates, the position controller 128 positions the second sensor 126 to enable the capture of a second image targeting the region of interest. In one embodiment, the motion detection component 134 (e.g., an accelerometer) may provide motion information to the system controller 130. For example, the motion information may account for movement occurring during the latency incurred during processing by the region of interest detector 124. In one embodiment, the motion information and the set of coordinates may be integrated to enable a more precise positioning of the second sensor 126 by the position controller 128.

In one embodiment, the second sensor 126, positioned in accordance with the set of coordinates, captures a digital representation of a second image including the region of interest. For example, the second image may be a targeted image focused on the region of interest 112 and the object 114. In one embodiment, the second sensor 126 may employ image stabilization processing (e.g., controlling lens or sensor movements) to capture the second image. In one embodiment, the second sensor may be a telephoto sensor configured to capture a high resolution image (e.g., an image having a resolution of 1920×1200 pixels, 3840×2160 pixels, etc.). In one embodiment, the second sensor 126 is configured to capture images at a higher resolution than the first sensor 122. For example, a first image captured by the first sensor 122 may have a lower resolution than a second image captured by the second sensor 126.

In one embodiment, a digital representation of the second image that targets the region of interest 112 and the object 114 is received by the system controller 130. In one embodiment, the system controller 130 uploads the digital representation of the second image to the one or more services 160 for further processing. In one embodiment, the object detection system 120 transmits the digital representation of the second image to a detection and recognition service 160 via the network interface 132.

In one embodiment, the detection and recognition serviced 160 performs image analysis on the second image to identify the object 114 using one or more object detection applications. For example, the detection and recognition service 160 may perform face recognition to identify the object 114 as a person of interest. In one embodiment, the detection and recognition service 160 may store or log the result of the image analysis and the second image in the storage service 162.

In one embodiment, the service 160 may identify alert information associated with the detected object. For example, the service 160 may maintain a mapping between the identification of an object and a corresponding alert. In one embodiment, the service 160 may generate an alert including the alert information and transmit the alert to the object detection system 120. In one embodiment, the alert module 136 may receive the alert information from the service 160.

In one embodiment, the alert module 136 may be configured to provide a user of the object detection system 120 with an indication of the alert. For example, the alert module 136 may include a haptic feedback unit, an audio speaker, other sensory feedback component configured to communicate an alert to a user of the object detection system 120, or combination thereof. In another example, the alert module 136 may include a communication component (e.g., a Bluetooth communicator, a LAN communicator) communicatively connectable to another device (e.g., a watch, a mobile device, a computer, etc.) for providing an indication of the alert. In one embodiment, the system controller 130 manages operation of the various components of the object detection system 120 to perform the functionality described above and with regard to FIGS. 2-7.

Figure 2:
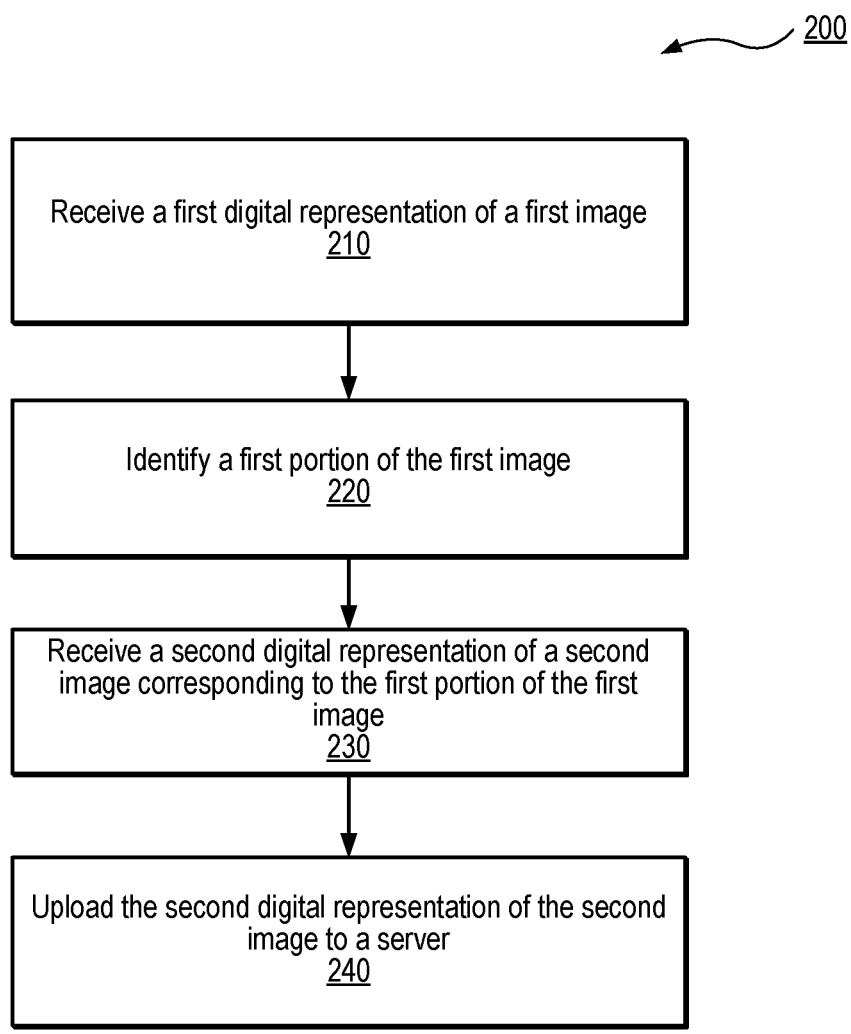
FIG. 2 is a flow diagram illustrating one embodiment of an image capture process, according to one embodiment.

FIG. 2 illustrates a flowchart that provides an example of a process 200 executed by an object detection system (e.g., object detection system 120 of FIG. 1), according to various embodiments. It is understood that the flowchart of FIG. 2 provides an example of the many different types of functional arrangements that may be employed to implement the operation of the object detection system 120 as described herein. Process 200 may be performed by a processing logic that may comprise hardware (e.g., circuitry, dedicated logic, programmable logic, microcode, etc.), software (e.g., instructions run on a processing device), or a combination thereof. In one embodiment, the object detection system executes the method 200 to detect an object in an environment.

In block 210, a first digital representation of a first image is received. In one embodiment, the first image and corresponding digital representation are captured by a first sensor of the object detection system. In one embodiment, the digital representation of the first image includes information defining the image, such as the image properties and size. For example, the first digital representation of the first image may be captured by a first sensor (e.g., a wide-angle sensor) and received by a system controller of the object detection system.

In block 220, a first portion of the first image is identified based on an analysis of the first image using one or more object detection models. For example, the first portion of the first image may correspond to a region of interest of the first image. In one embodiment, a region of interest detector may use "onboard" object detection models that are locally stored on the object detection system. Examples of such object detection models include models that can identify faces, specific types of objects (e.g., weapons), people, animals, automobiles, and so on.

In block 230, a second digital representation of a second image corresponding to the first portion of the first image is received. In one embodiment, the second image may be captured by a second sensor positioned in accordance with information derived from the first digital representation of the first image. In one embodiment, the second digital representation corresponds to a high resolution image targeting an area associated with the first portion of the first image.

In block 240, the second digital representation of the second image is uploaded to a server configured to perform object detection and recognition services. In one embodiment, by uploading the second image corresponding to the region of interest in an environment, benefits associated with utilization of bandwidth, power consumption, and cost may be achieved. For example, the object detection system may generate a continuous sequence of images (e.g., a video) using the first sensor. However, the object detection system may not send the continuous sequence of images to an object detection and recognition service. Instead, the object detection system may identify regions of interest in one or more of the images in the sequence of images, and may generate smaller images of the regions of interest in the one or more images of the sequence of images. These smaller images may then be sent to the object detection and recognition service.

Figure 3:
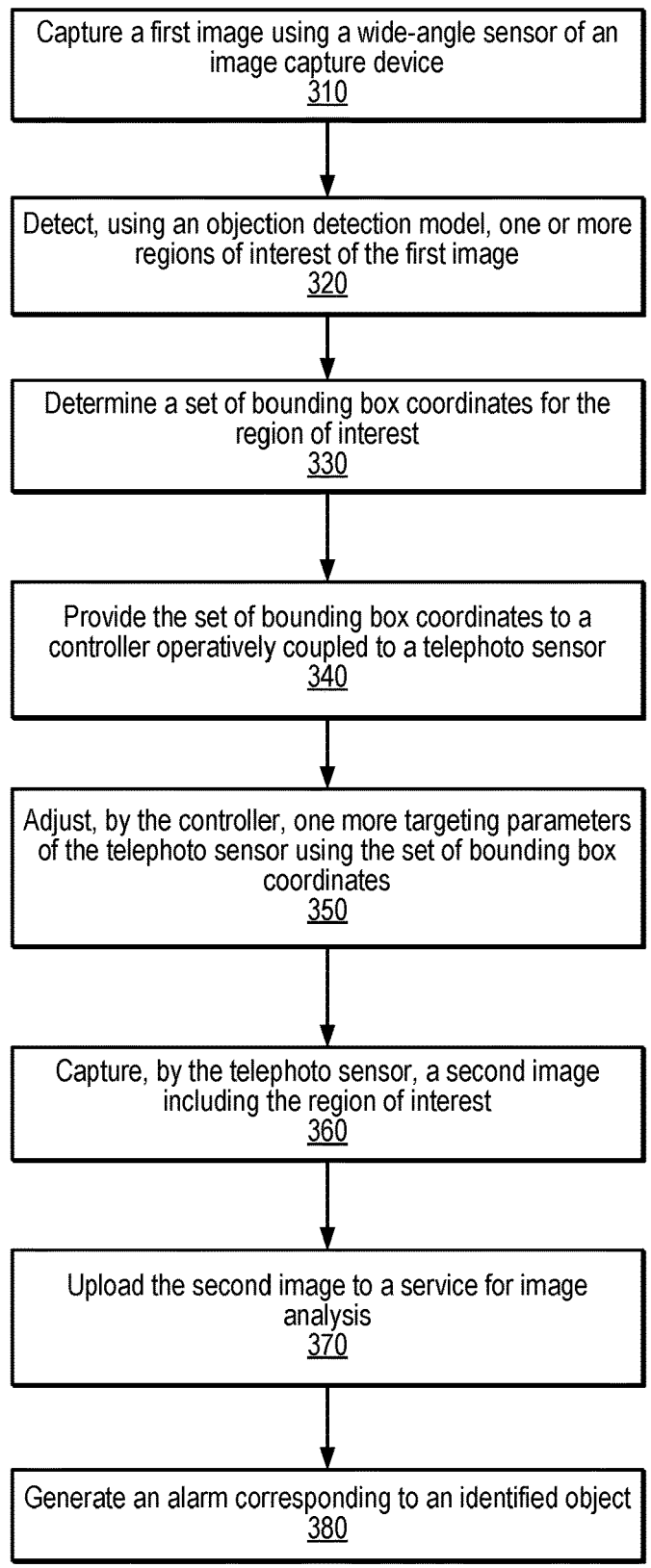
FIG. 3 is a flow diagram illustrating one embodiment of an image capture process, according to one embodiment.

FIG. 3 illustrates a flowchart that provides an example of a process 300 executed by an object detection system (e.g., object detection system 120 of FIG. 1), according to various embodiments. It is understood that the flowchart of FIG. 3 provides an example of the many different types of functional arrangements that may be employed to implement the operation of the object detection system 120 as described herein. Process 300 may be performed by a processing logic that may comprise hardware (e.g., circuitry, dedicated logic, programmable logic, microcode, etc.), software (e.g., instructions run on a processing device), or a combination thereof. In one embodiment, the object detection system executes the method 300 to detect an object in an environment.

In block 310, a first image is captured using a first sensor (e.g., a wide-angle sensor) of an image capture device. In one embodiment, first image may be a low resolution image of an environment including one or more objects.

In block 320, one or more regions of interest including candidate objects of interest are detected using an object detection model. In one embodiment, the one or more regions of interest represent one or more corresponding portions of the first image.

In block 330, for each identified region of interest, a set of coordinates are determined. In one example, the set of coordinates may include the region or bounding box coordinates corresponding to a portion of the first image including an object identified using the one or more object detection models. For example, a first portion of the first image (e.g., a first region of interest) is identified and the bounding box coordinates (e.g., Bbox=left coordinate, bottom coordinate, right coordinate, top coordinate; or Bbox=lower left coordinate, upper right coordinate) are determined.

In block 340, the set of bounding box coordinates are provided to a controller configured to control the positioning of a second sensor (e.g., a telephoto sensor). In block 350, the controller (e.g., position controller 128 of FIG. 1) adjusts at least one of a pitch parameter, yaw parameter, or zoom parameter associated with the second sensor. In one embodiment, by setting the position parameters (e.g., pitch, yaw, and zoom parameters), the second sensor may target the first portion of the environment corresponding to the first region of interest. In one embodiment, the controller further adjusts a zoom parameter associated with the second sensor.

In block 360, the second sensor captures a second image including the targeted portion of the environment corresponding to the identified region of interest including the object of interest. In one embodiment, the second image may be captured using image stabilization processing. In one embodiment, the image captured by the second sensor has a higher resolution than the image captured by the first sensor.

In one embodiment, for each portion or region of interest identified in block 320, the processing identified in blocks 330-360 may be repeated. For example, if three regions of interest are identified in block 320, blocks 330-360 are repeated for each of the regions of interest to generate three images targeting the respective regions of interest and corresponding objects of interest.

In block 370, the second image (or a digital representation of the second image) is uploaded to a service for image analysis. In one embodiment, if network access is impacted, the one or more images designated for upload to the service may be buffered locally until the upload is retried. In one embodiment, if multiple regions of interest are identified and multiple higher resolution images are captured by the second sensor, each of those images is uploaded in block 370.

In block 380, an alarm corresponding to the object (as identified by the service) is generated. In one example, the alarm may be generated using an alarm module (e.g., alarm module 136 of FIG. 1), such as a haptic Feedback unit, an audio generating component, or other component configured to generate an alarm.

In one embodiment, blocks 310-370 may be iteratively performed according to a configured framerate. For example, the object detection system may be configured to repeat the above-described blocks on a continuous basis to create a "stream" of images uploaded to the service for analysis.

Figure 4:
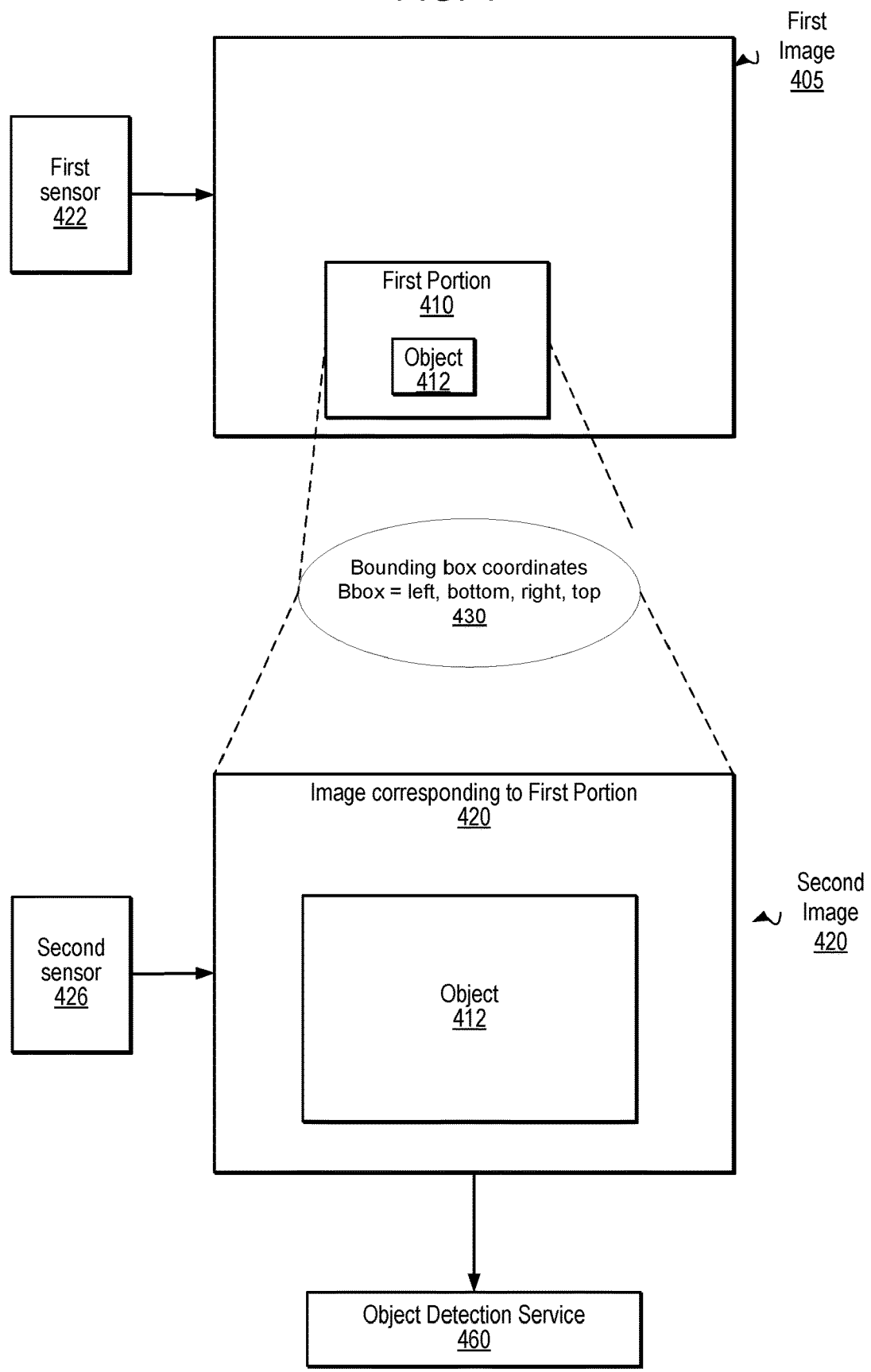
FIG. 4 depicts an example image targeting process, according to one embodiment.

FIG. 4 depicts an example image targeting process, according to one embodiment. As shown in FIG. 4, a first sensor 422 captures a first image 405. In one embodiment, a first portion 410 of the first image 405 is identified. For example, the first portion 410 is identified as including an object 412 identified using an object detection model. In one embodiment, a set of coordinates (e.g., bounding box coordinates) 430 corresponding to the first portion 410 of the first image 405 is identified and used by a second sensor 426 to capture a second image 420.

In one embodiment, the second image 420 corresponds to the first portion of the environment including the object 412, as identified from the first image. In an example, the second image 420 captures a targeted or zoomed-in representation of the first portion 410, thereby capturing a targeted representation of the object 412. In one embodiment, the second image 420 is uploaded to the object detection service 460 for further image processing.

Figure 5:
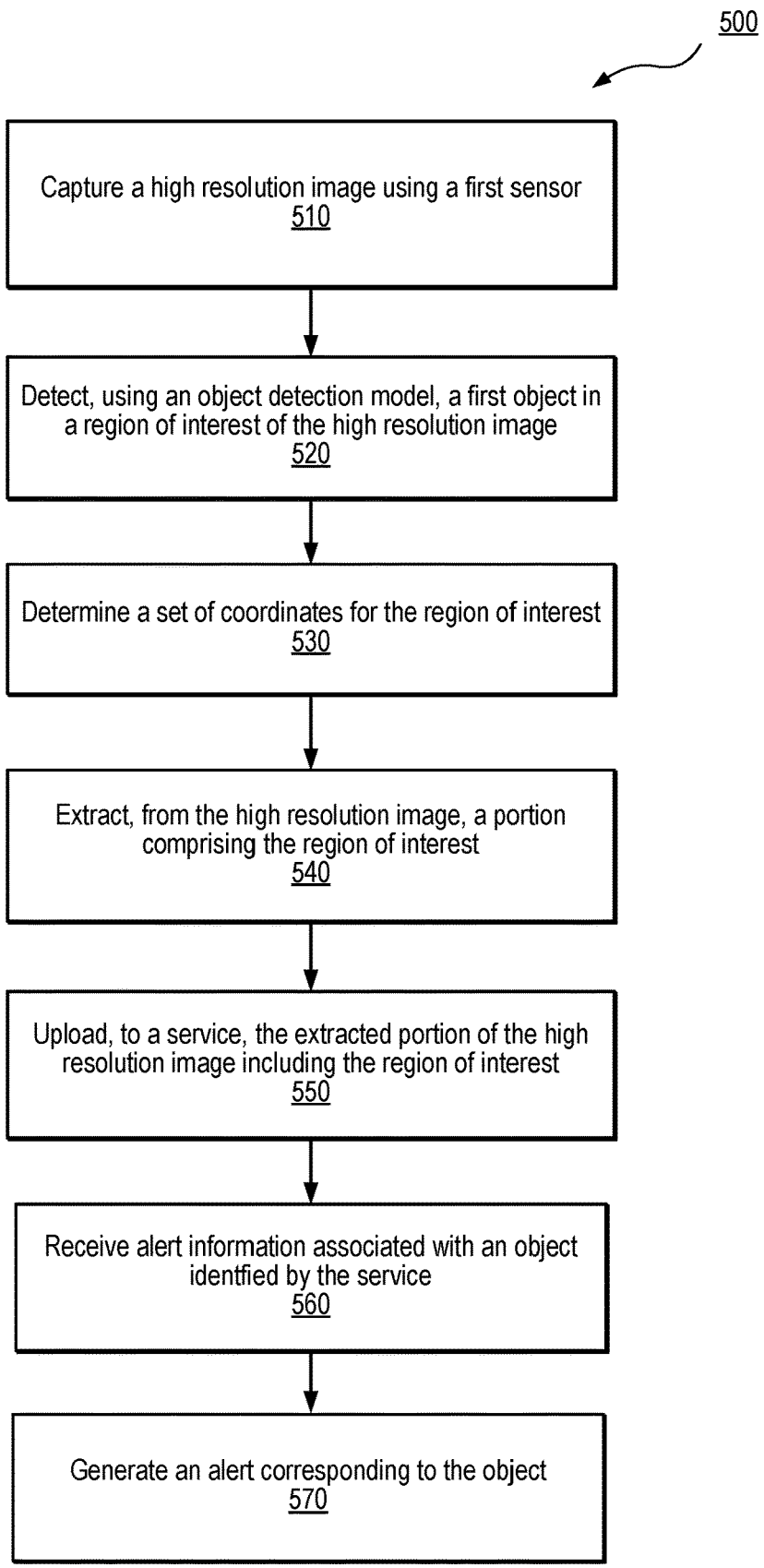
FIG. 5 depicts is a flow diagram illustrating one embodiment of an image capture process, according to one embodiment.

FIG. 5 illustrates a flowchart that provides an example of a process 500 executed by an object detection system (e.g., object detection system 120 of FIG. 1), according to various embodiments. In one embodiment, the process 500 illustrated in FIG. 5 is directed to an embodiment wherein a high resolution image is captured and processed by the object detection system.

In block 510, a high resolution image is captured using a first sensor of an object detection system. In one embodiment, the first sensor may include a wide-angle sensor configured to capture high resolution images of an environment. For example, the first sensor may be a wide-angle sensor capable of capturing 4K resolution images.

In block 520, using one or more objection detection models, a first object is detected in a portion of the high resolution image. In block 530, a set of coordinates defining a location or position for each of the one or more regions of interest is identified. In block 540, using the set of coordinates, the portion of the high resolution image is extracted. In one embodiment, the extracted portion of the first image corresponds to the identified region of interest. In block 550, the extracted portion of the high resolution image is uploaded to a service for further image analysis. In one embodiment, only the extracted portion of the image is uploaded to the service, thereby resulting in a savings of bandwidth, power consumption, and processing cost.

In block 560, the object detection system receives alert information associated with the object identified by the service. In one embodiment, the alert information is identified by the service in connection with the object detected during analysis of the uploaded image. In block 570, the object detection system generates an alert based on the alert information. In one embodiment, the alert may be auditory (e.g., via a speaker), tactile (e.g., via a haptic feedback unit), or visual (e.g., via a light or other visual output device).

Figure 6:
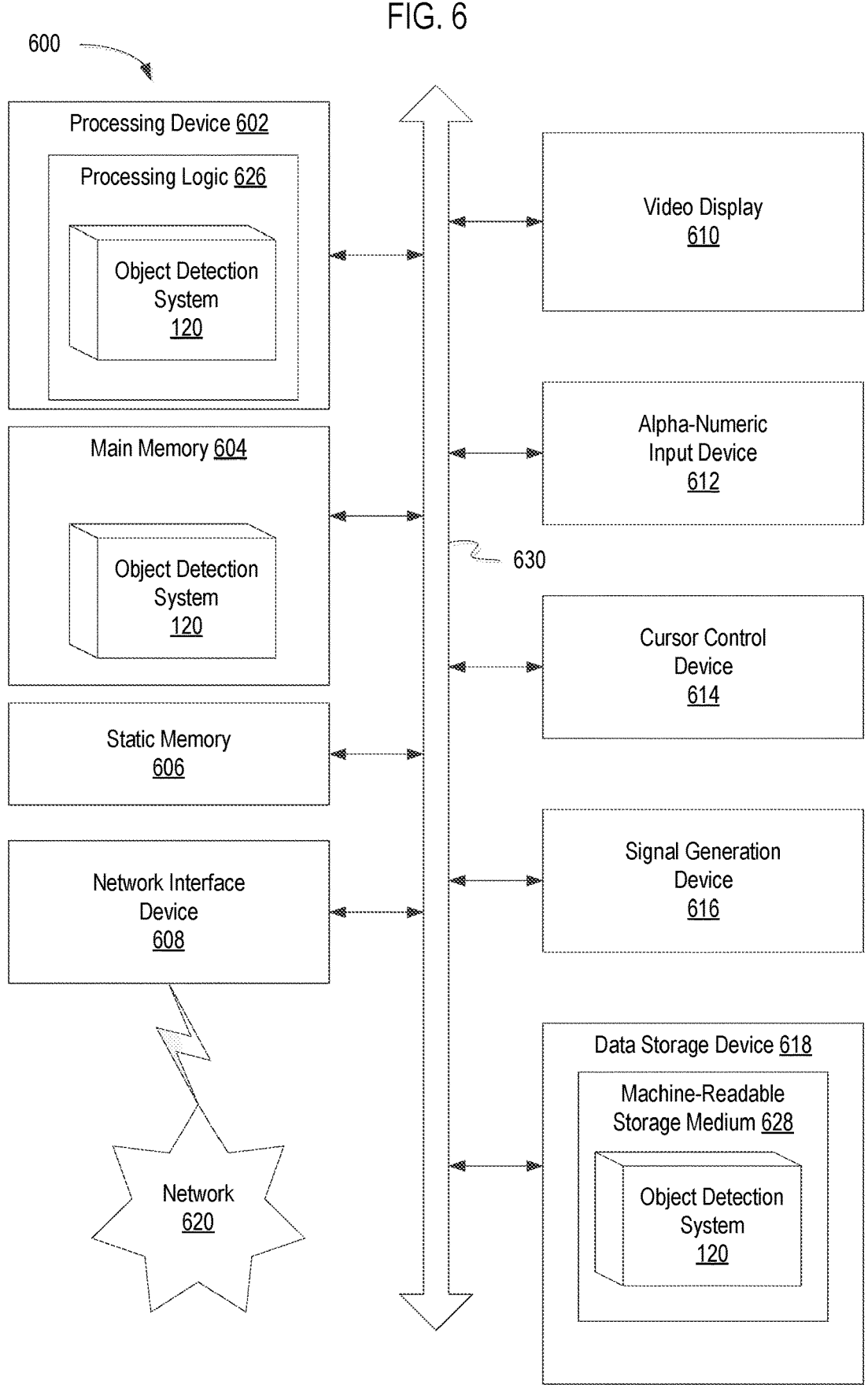
FIG. 6 is a schematic block diagram that provides an example illustration of a computing environment executing instructions relating to deploying an application, according to one embodiment.

FIG. 6 illustrates a diagrammatic representation of a machine in the example form of a computer system 600 including a set of instructions executable by an object detection system 120 to cause the system to perform any one or more of the methodologies discussed herein. In one embodiment, the object detection system may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for the object detection system 120 for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the object detection system 120 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving a first digital representation of a first image captured by a sensor of a device, wherein the first image has a first resolution;
    storing, in a local memory of the device, an object detection model;
    applying the object detection model to the first image;
    detecting an object in a first portion of the first image from an output of the object detection model;
    receiving a second digital representation of a second image corresponding to the first portion of the first image, wherein the second image has a second resolution greater than the first resolution;
    uploading, via a network, the second digital representation of the second image to a server; and
    receiving, from the server, information associated with an identification of the object generated by the server based on the second digital representation.

2. The method of claim 1, wherein the sensor comprises a wide-angle sensor.

3. The method of claim 1, wherein identifying the first portion of the first image comprises detecting, using the object detection model, the object is located in the first portion of the first image.

4. The method of claim 3, further comprising determining a set of coordinates associated with the first portion of the first image, wherein the set of coordinates defines a position of the first portion.

5. The method of claim 4, further comprising providing the set of coordinates to a first controller operatively coupled to a telephoto sensor configured to capture the second image.

6. The method of claim 5, further comprising:
    adjusting, by the first controller, at least one targeting parameter of the telephoto sensor using the set of coordinates; and
    capturing, by the telephoto sensor, the second image corresponding to the first portion of the first image.

7. A device comprising:
    a memory to store instructions associated with an object detection model;
    a first sensor to capture a first image of an environment comprising a first object;
    a processing device operatively coupled to the memory and the first sensor, the processing device to:
        execute the object detection model stored locally in the memory of the device to the first image;
        detect a first object in a first portion of the first image from an output of the object detection model; and
        determine a set of coordinates associated with the first portion of the first image;
    a first controller operatively coupled to the processing device, the first controller to:
        receive the set coordinates; and
        adjust, using the set of coordinates, at least one targeting parameter of an operatively coupled second sensor to target an area of the environment corresponding to the first portion of the first image; and
    the second sensor to capture a second image comprising the area comprising the first object, wherein the second image has a higher resolution than the first image; and
    wherein the processing device is further to upload, via a network, the second image to a service to cause the service to generate an identification of the first object.

8. The device of claim 7, wherein the first sensor comprises a wide-angle sensor and the second sensor comprises a telephoto sensor.

9. The device of claim 7, wherein the at least one targeting parameter comprises at least one of a pitch parameter, a yaw parameter, or a zoom parameter associated with the second sensor.

10. The device of claim 7, the processing device to receive additional instructions associated with an additional object detection model, wherein the additional object detection model is stored in the memory.

11. The device of claim 7, further comprising a second controller operatively coupled to the second sensor, wherein the second controller controls a position of the second sensor using the at least one targeting parameter.

12. The device of claim 7, the processing device to receive, from the service, information associated with the identification of the first object.

13. The device of claim 7, the processing device to receive information associated with an alert corresponding to the identification of the first object.

14. The device of claim 7, further comprising a motion detection component configured to identify movement information associated with the device.

15. The device of claim 14, the processing device to adjust the at least one targeting parameter based at least in part on the movement information.

16. A non-transitory computer-readable storage device storing computer-executable instructions that, if executed by a processing device, cause the processing device to:
    receive, by a sensor of a device, a first digital representation of a first image corresponding to at least a portion of an environment comprising a first object;
    detect, using a locally stored object detection model executed by the processing device, the first object in a first portion of the first image;
    determine a set of coordinates associated with the first portion of the first image, wherein the set of coordinates identify the first portion of the first image;
    extract, from the first image, a second digital representation of the first portion; and
    upload, via a network, the second digital representation of the first portion to a service, wherein the second digital representation is a smaller size than the first digital representation.

17. The non-transitory computer-readable storage device of claim 16, wherein the sensor of the device comprises a high resolution wide-angle sensor.

18. The non-transitory computer-readable storage device of claim 16, the processing device to apply an object detection model to identify the first object in the first portion of the first image.

19. The non-transitory computer-readable storage device of claim 16, the processing device to receive, from the service, an alert associated with the first object.

20. The non-transitory computer-readable storage device of claim 16, the processing device to:
   receive an object detection model; and
   apply the object detection model to the first digital representation of the first image to detect the first object.

* * * * *